(12) United States Patent
Nakamura et al.

(10) Patent No.: US 9,398,074 B2
(45) Date of Patent: Jul. 19, 2016

(54) NETWORK SYSTEM, DEVICE SERVER, AND NETWORK SYSTEM CONTROL METHOD

(75) Inventors: Hideo Nakamura, Nagano-ken (JP); Koji Nishizawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 248 days.

(21) Appl. No.: 14/000,380

(22) PCT Filed: Feb. 2, 2012

(86) PCT No.: PCT/JP2012/000701
§ 371 (c)(1),
(2), (4) Date: Aug. 19, 2013

(87) PCT Pub. No.: WO2012/114660
PCT Pub. Date: Aug. 30, 2012

(65) Prior Publication Data
US 2013/0332520 A1    Dec. 12, 2013

(30) Foreign Application Priority Data

Feb. 21, 2011   (JP) ................................. 2011-034278

(51) Int. Cl.
G06F 15/16      (2006.01)
H04L 29/08      (2006.01)
H04N 1/00       (2006.01)
G06F 3/12       (2006.01)

(52) U.S. Cl.
CPC ............ *H04L 67/10* (2013.01); *H04N 1/00127* (2013.01); *H04N 1/00225* (2013.01); *G06F 3/122* (2013.01); *G06F 3/1204* (2013.01); *G06F 3/1228* (2013.01); *G06F 3/1247* (2013.01); *G06F 3/1268* (2013.01); *G06F 3/1287* (2013.01); *G06F 3/1289* (2013.01); *H04N 2201/001* (2013.01)

(58) Field of Classification Search
CPC ..... G06F 3/1204; G06F 3/122; G06F 3/1228; G06F 3/1247; G06F 3/1268
USPC ................................. 709/201, 202, 203, 205
See application file for complete search history.

(56) References Cited

U.S. PATENT DOCUMENTS

| | | | |
|---|---|---|---|
| 6,289,371 B1 * | 9/2001 | Kumpf et al. | 709/203 |
| 7,065,564 B2 | 6/2006 | Machida | |
| 7,085,814 B1 * | 8/2006 | Gandhi | H04L 29/1232 709/208 |
| 7,567,360 B2 * | 7/2009 | Takahashi | G06F 3/1205 358/1.15 |

(Continued)

FOREIGN PATENT DOCUMENTS

| | | |
|---|---|---|
| EP | 1 102 159 A2 | 5/2001 |
| JP | 2002-251347 A | 9/2002 |

(Continued)

*Primary Examiner* — Phuoc Nguyen
*Assistant Examiner* — Davoud Zand

(57) ABSTRACT

A network system enables controlling an image input device without requiring a driver that depends on the computer environment. A client terminal has a component that acquires a web page having an embedded scanner control script that controls image input from a scanner; a component that sends an image acquisition request through an interface board to the scanner as controlled by the scanner control script; and a component that gets an image from the scanner as a response to the image acquisition request as controlled by the scanner control script. The interface board receives the image acquisition request, and sends the image scanned by the scanner based on the received image acquisition request to the client terminal.

3 Claims, 4 Drawing Sheets

(56) References Cited

U.S. PATENT DOCUMENTS

| | | | |
|---|---|---|---|
| 7,606,874 B2 | 10/2009 | Machida | |
| 8,054,494 B2* | 11/2011 | Takahashi | G06F 3/1205 358/1.15 |
| 2002/0062259 A1* | 5/2002 | Katz | G06Q 30/06 705/27.1 |
| 2002/0062287 A1* | 5/2002 | Katz | G06Q 30/0603 705/51 |
| 2002/0065950 A1* | 5/2002 | Katz | H04N 21/235 719/318 |
| 2002/0069239 A1* | 6/2002 | Katada et al. | 709/202 |
| 2002/0083131 A1 | 6/2002 | Machida | |
| 2003/0151050 A1 | 8/2003 | Fox et al. | |
| 2004/0190057 A1* | 9/2004 | Takahashi | G06F 3/1205 358/1.15 |
| 2006/0206605 A1 | 9/2006 | Machida | |
| 2008/0177994 A1* | 7/2008 | Mayer | G06F 9/4418 713/2 |
| 2009/0013044 A1* | 1/2009 | Stull | 709/205 |
| 2009/0100422 A1* | 4/2009 | Abe | G06F 9/4411 717/174 |
| 2009/0219568 A1 | 9/2009 | Machida | |
| 2009/0244620 A1* | 10/2009 | Takahashi | G06F 3/1205 358/1.15 |
| 2010/0057586 A1* | 3/2010 | Chow | G01S 19/14 705/26.1 |
| 2010/0208298 A1 | 8/2010 | Kitagata | |
| 2010/0208300 A1 | 8/2010 | Kamasuka | |
| 2010/0290081 A1 | 11/2010 | Uchida | |

FOREIGN PATENT DOCUMENTS

| | | |
|---|---|---|
| JP | 2008-152545 A | 7/2008 |
| JP | 2008-193217 A | 8/2008 |
| JP | 2009-015750 A | 1/2009 |

* cited by examiner

NETWORK SYSTEM, DEVICE SERVER, AND NETWORK SYSTEM CONTROL METHOD

TECHNICAL FIELD

The present invention relates to a network system to which one or more image input devices are connected for use, a device server, and a network system control method.

BACKGROUND ART

Devices such as scanners and printers are commonly used connected over a network to a computer, but device drivers for controlling the devices are required in order to use the devices. The device drivers are generally installed to the computer connected to the devices (see, for example, PTL1).

CITATION LIST

Patent Literature

[PTL1] JP-A-2002-251347

SUMMARY OF INVENTION

Technical Problem

However, because device driver operation depends on the OS (operating system) of the computer to which the device driver is installed, the user must install the device driver corresponding to the OS installed on the user's computer. However, the task of determining the OS that is used and installing software (device drivers) can be difficult for users that are not computer-savvy, and can be a significant burden. Reinstalling device drivers is also necessary when the computer is replaced. Another problem is that the device manufacturer must develop a device driver for each different computer OS, thus increasing development costs.

With consideration for the foregoing problem, an object of the present invention is to provide a network system enabling controlling an image input device without requiring a device driver that depends on the computer environment, to a device server, and to a network system control method.

Solution to Problem

A network system according to the invention is a network system that includes a web application server on which a web application operates, one or more client terminals that use a web browser to access the web application server, and an image input device that operates in conjunction with operation of the client terminal, wherein at least the web application server and the client terminal, and the client terminal and the image input device, are respectively connected over a network, the network system characterized by: the client terminal including a web page acquisition unit that gets from the web application server a web page having an embedded image input control script that operates at least on the web browser and controls image input from the image input device, an image acquisition request transmission unit that is controlled by the image input control script to send an image acquisition request to the image input device when a specific operation is performed on the acquired web page, and an image acquisition unit that is controlled by the image input control script to acquire an image from the image input device as a response to the image acquisition request; and the image input device including an image acquisition request receiving unit that receives the image acquisition request, and an image transmission unit that sends an image to the client terminal based on the received image acquisition request.

A network system control method according to the invention is a control method for a network system that includes a web application server on which a web application operates, one or more client terminals that use a web browser to access the web application server, and an image input device that operates in conjunction with operation of the client terminal, wherein at least the web application server and the client terminal, and the client terminal and the image input device, are respectively connected over a network, the control method of the network system characterized by: the client terminal executing a web page acquisition step of getting from the web application server a web page having an embedded image input control script that operates at least on the web browser and controls image input from the image input device, an image acquisition request transmission step that is controlled by the image input control script to send an image acquisition request to the image input device when a specific operation is performed on the acquired web page, and an image acquisition step that is controlled by the image input control script to acquire an image from the image input device as a response to the image acquisition request; and the image input device executing an image acquisition request reception step to receive the image acquisition request, and an image transmission step to send an image to the client terminal based on the received image acquisition request.

These configurations enable acquiring a specific image from an image input device by means of an image input control script that is embedded in a web page. More specifically, because the image input device can be controlled using a web browser (in a web page), an image input device can be controlled by simply installing a web browser to the client terminal, and there is no need to install a device driver (a driver for the image input device) on each client terminal as there is with the related art. The need to develop a plurality of device drivers for different operating systems is also eliminated for the manufacturer of the image input device, and related development costs can therefore be reduced.

Furthermore, because a web browser is typically already installed on most modern client terminals (computers including personal computers and smartphones), even users that are not computer-savvy can easily use the image input device without knowing the operating environment (the type of operating system) of the terminal being used by the user. Note that scanners and digital cameras are examples of image input devices.

In a network system according to another aspect of the invention, the client terminal preferably also has a selection window display unit that is controlled by the image input control script to display a selection window for selecting whether or not to stop operation of the image input device when a change event that changes the web page occurs while the image input device is operating, and a stop operation request transmission unit that is controlled by the image input control script to send a stop operation request to the image input device when stopping operation of the image input device is selected in the selection window.

When the operator (user) performs an action to change the web page, this aspect of the invention informs the user that the image input device is operating and causes the user to select whether or not to stop operation of the image input device. Because the invention controls the image input device with a script (image input control script), the image input control script is lost if the web page changes while the image input device is operating (processing). By displaying a selection window when an event that changes the web page occurs, this aspect of the invention can prevent a process from being interrupted unintentionally as a result of the web page being accidentally changed by the operator (user).

A network system according to another aspect of the invention preferably also has a printer that connects over a network to the client terminal, wherein: a printing control script that operates on the web browser and controls printing related to the web page is also embedded in the web page acquired by the web page acquisition unit; the client terminal includes a drawing process unit that is controlled by the image input control script to draw an image acquired by the image acquisition unit in a specific drawing area, a print data generating unit that is controlled by the printing control script in conjunction with a print operation on the web page to generate print data that converts the image data drawn in the drawing area to a form that can be processed by the printer, and a print data transmission unit that is controlled by the printing control script to send the generated print data to the printer; and the printer includes a print data receiving unit that receives the print data sent by the print data transmission unit, and a print control unit that controls a printing process based on the received print data.

This aspect of the invention can print images acquired by the image input device from the printer (can control printing by the printer) by means of the printing control script embedded in the web page. More specifically, because printing by the printer can be controlled by a script that operates on the web browser (operates in a web page), installing a web browser on the client terminal is sufficient, and there is no need to install a device driver (printer driver) on each client terminal as there is with the related art.

A device server according to the invention has the parts of the image input device in the network system described above, and is used connected to the image input device.

Further preferably, the device server of the invention also has the parts of the printer in the network system described above, and is used connected to the printer.

With these configurations the invention can be achieved by connecting the device server without changing the image input device or printer (without incorporating a special function). The device server can be achieved by an interface board (interface device) that can connect to the image input device or printer.

DESCRIPTION OF EMBODIMENTS

A network system, device driver, and method of controlling a network system according to this embodiment of the invention are described below with reference to the accompanying figures. The network system according to this embodiment is a system that can run an image input process using a web browser without installing a dedicated device driver on the client terminal. Note that a scanner is used as an example of an image input device in this embodiment.

Figure 1:
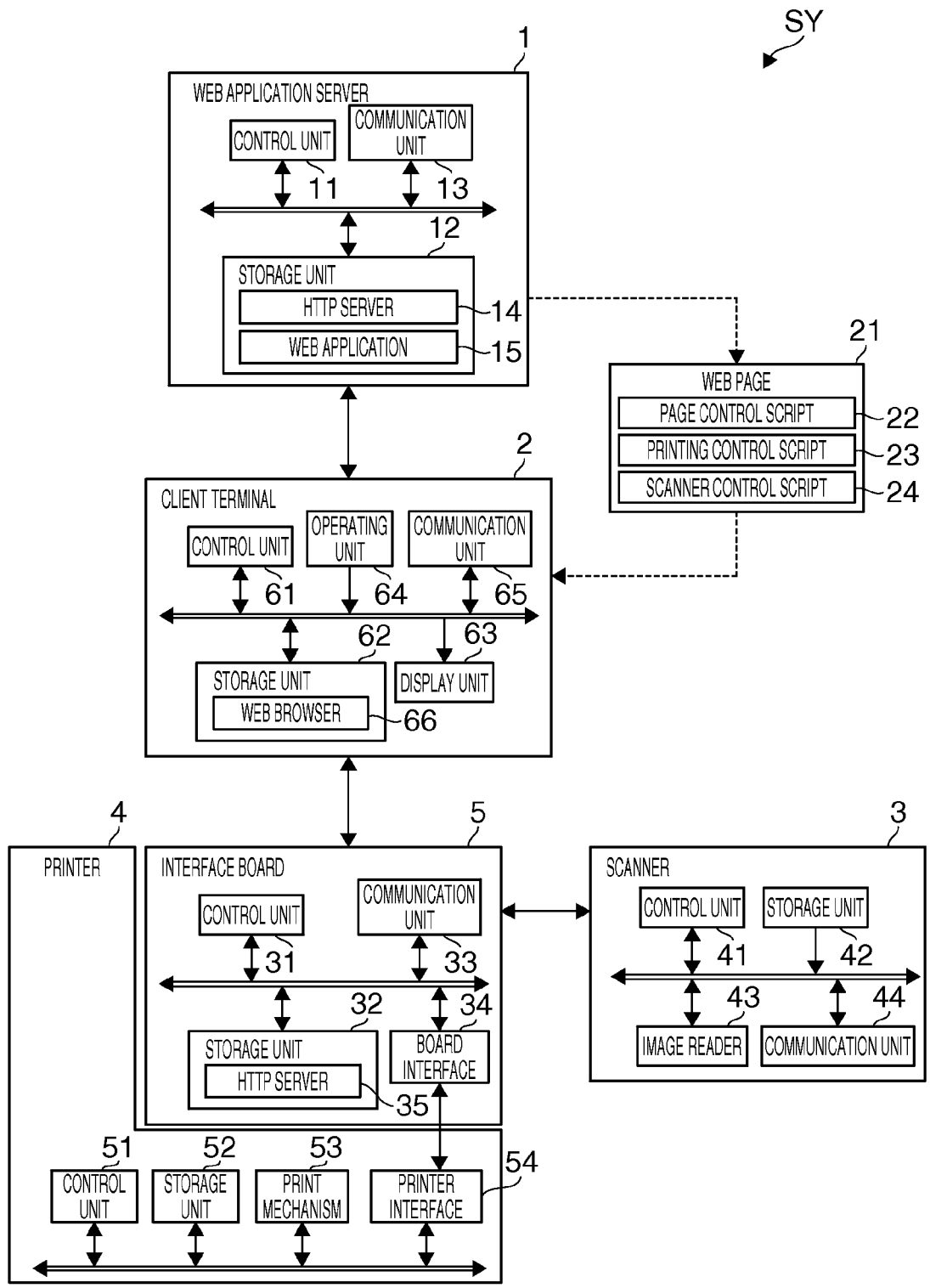
FIG. 1 shows the configuration of a network system according to an embodiment of the invention.

FIG. 1 shows the configuration of the network system SY. As shown in the figure, the network system SY includes a web application server 1, a client terminal 2 that accesses the web application server 1, a scanner 3 (image input device) that scans a specific document based on a request from the client terminal 2, a printer 4 that prints based on a request from the client terminal 2, and a removable interface board 5 (device driver) that is installed to the printer 4. The web application server 1 and client terminal 2 are connected so that they can communicate over the Internet. The client terminal 2 and interface board 5 are connected so that they can communicate over a LAN. The scanner 3 is connected through an communication unit 33 disposed to the interface board 5 installed in the printer 4. The client terminal 2 can thus communicate through the interface board 5 with the scanner 3 and printer 4.

Note that the method of connecting to the network (Internet or LAN) may be by wire or wireless. FIG. 1 also shows only one client terminal 2, scanner 3, and printer 4, but the invention is not so limited and any number of these can be used.

The web application server 1 has the hardware configuration of a general computer in addition to a control unit 11, storage unit 12, and communication unit 13. The main parts of the control unit 11 include a CPU (central processing unit), ROM (read-only memory), and RAM (random access memory). The CPU runs a program stored in ROM, and controls operation of the web application server 1. ROM stores control data and a control program enabling the CPU to execute various processes. RAM is used as working memory for the CPU to execute different processes. The storage unit 12 stores an HTTP server 14 and web application 15.

The communication unit 13 is an interface for communicating with the client terminal 2 (web browser 66). Communication between the web application server 1 and client terminal 2 is controlled by the HTTP server 14 using Hypertext Transfer Protocol (HTTP). More specifically, the web application server 1 receives an HTTP request from the client terminal 2 (web browser 66), and based on the URL (Uniform Resource Locator) contained in the HTTP request, sends a web page 21 provided by the web application 15 to the client terminal 2.

As described in detail below, in addition to a page control script 22 (JavaScript (R)) for controlling the web page 21, a printing control script 23 (JavaScript (R)) for controlling printing related to the web page 21, and a scanner control script 24 (JavaScript (R), an image control script) that controls image input from the scanner 3, are included (embedded) in the web page 21, and the client terminal 2 executes a printing process and an image acquisition process (image input process) by running the printing control script 23 and scanner control script 24 through the web browser 56 (on the web page 21). The printing control script 23 and scanner control script 24 can be contained on different web pages 21, or both may be contained on a single web page The interface board 5 includes a control unit 31, storage unit 32, communication unit 33, and board interface 34. The control unit 31 primarily includes a CPU and RAM. The CPU runs a program stored in the storage unit 32 and controls the interface board 5. RAM is used as working memory for the CPU to execute processes. The storage unit 32 is, for example, nonvolatile memory (such as flash ROM), and stores control data and control programs for the CPU to execute the processes. The storage unit 32 also an HTTP server 35.

The board interface 34 is a port for installation to the printer 4, and communication with the printer 3A passes through this board interface 34. The communication unit 33 is an interface for communicating with the client terminal 2 (web browser 66) and scanner 3, and comprises a group of interfaces compatible with different kinds of connections, such as a LAN interface and a USB interface.

The HTTP server 35 handles communication between the interface board 5 and the client terminal 2 (web browser 66) using HTTP. More specifically, when a process request for the scanner 3 (such as an image acquisition request or stop scanning request), or a process request for the printer 4 (such as a printing process request), is sent from the client terminal 2 to the service endpoint address (URI) assigned to the interface board 5, the interface board 5 sends a process command to the scanner 3 or printer 4 based on the received process request (as described in detail below).

The scanner 3 primarily includes a control unit 41, storage unit 42, image reader 43, and communication unit 44. The control unit 41 primarily includes a CPU and RAM. The CPU runs a program stored in the storage unit 42 and controls the scanner 3. RAM is used as working memory for the CPU to execute processes. The storage unit 42 is, for example, non-volatile memory (such as flash ROM), and stores control data and control programs for the CPU to execute the processes.

The image reader 43 optically reads (scans) documents, such as text or photographs, placed on the document table (not shown) as controlled by the CPU. The communication unit 44 is an interface for communicating with the interface board 5, and comprises a group of interfaces compatible with different kinds of connections, such as a LAN interface and a USB interface. The scanner 3 receives an image acquisition command from the client terminal 2 through the interface board 5, scans the document, and then sends the result of scanning to the client terminal 2.

The printer 4 primarily includes a control unit 51, storage unit 52, print mechanism 53, and printer interface 54. The control unit 51 primarily includes a CPU and RAM. The CPU runs a program stored in the storage unit 52 and controls the printer 4. RAM is used as working memory for the CPU to execute processes. The storage unit 52 is, for example, non-volatile memory (such as flash ROM), and stores control data and control programs for the CPU to execute the processes.

The print mechanism 53 includes a paper feed mechanism, printhead, and paper cutting mechanism, and performs a printing operation as controlled by the CPU. Any desired printing method may be used, including an inkjet or laser printing method. The board interface 54 is a port that connects to the interface board 5 (board interface 34), and communicates with the interface board 5. The printer 4 receives print data sent from the client terminal 2 through the interface board 5, and controls the print mechanism 53 to print based on the received print data.

The client terminal 2 primarily includes a control unit 61, storage unit 62, display unit 63, operating unit 64, and communication unit 65. The control unit 61 primarily includes a CPU and RAM. The CPU runs a program stored in the storage unit 62 and controls the client terminal 2. RAM is used as working memory for the CPU to run processes. The storage unit 62 is, for example, a HDD (hard disk drive) or nonvolatile memory (such as flash ROM), and stores control data and control programs used by the CPU to execute different processes. The storage unit 62 also stores a web browser 66.

The display unit 63 displays a web page 21 acquired (downloaded) by the web browser 66, and displays windows for reporting events accompanying operations performed in the web browser 66, as well as windows for configuring settings and selections. These windows could be displayed in the web page 21 displayed by the web browser 66, or displayed in a new web page 21. The operating unit 64 is an operating means for performing input operations (such as inputting text and drawing figures), and making selection/decision operations, image acquisition operations (scanning operations), and printing operations, in a web page 21 displayed by the web browser 66. Note that the display unit 63 and operating unit 64 may be rendered as separate elements, or rendered in unison by, for example, using a touch screen panel as the display unit 63.

The communication unit 65 is an interface for communication with the web application server 1 and interface board 5, and the client terminal 2 uses the web browser 66 to communicate with the devices. The web browser 66 is a simple browser (standard browser) with no plugin modules, and the client terminal 2 uses this web browser 66 to access the network-connected (Internet-connected) web application server 1 and receive web pages 21 provided by the web application 15.

The web page 21 includes a page control script 22, printing control script 23, and scanner control script 24 as described above, and when an image acquisition operation (such as pressing a scan button or clicking on a specific area) is performed by the user in the web browser 66 (on the web page 21), the web browser 66 runs the scanner control script 24 embedded in the web page 21, acquires (inputs) the image data from the scanner 3 through the interface board 5, and draws the image data in a specific drawing area. This drawing area is a drawing canvas (HTML5 canvas element) defined (set) in the page control script 22, for example.

When the user issues a print command (such as by pressing a print button) on the web page 21, the web browser 66 runs the printing control script 23 embedded in the web page 21, generates print data from the image data written in the drawing area, and sends the print data to the printer 4 through the interface board 5.

The client terminal 2 may be any computer on which the web browser 66 runs, and may be a mobile terminal (such as a cellular telephone or smartphone) or personal computer (PC), for example.

Figure 2:
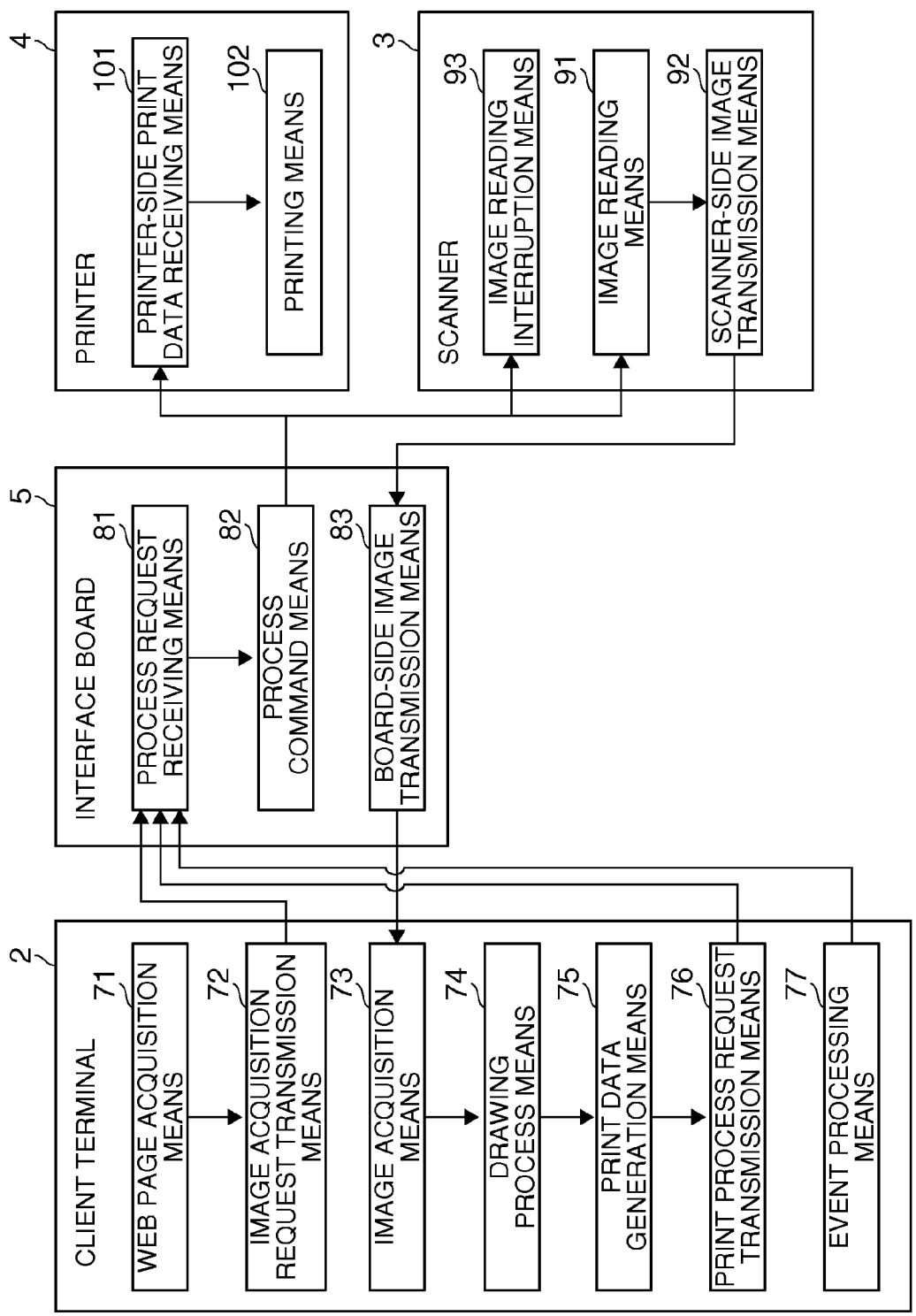
FIG. 2 is a block diagram showing the functional configuration of the network system.

The functional configuration of the network system SY is described next with reference to FIG. 2. The client terminal 2 has a web page acquisition means 71 (web page acquisition unit), image acquisition request transmission means 72 (image acquisition request transmission unit), image acquisition means 73 (image acquisition unit), drawing process means 74 (drawing process unit), print data generation means 75 (print data generation unit), print process request transmission means 76 (print process request transmission unit), and event processing means 77 (selection window display unit, stop operation request transmission unit).

The web page acquisition unit 71 primarily includes the control unit 61 and web browser 66, accesses the web application server 1 (web application 15) through the web browser 66, and gets the desired web page 21 (the web page 21 containing the page control script 22, printing control script 23, and scanner control script 24).

The image acquisition request transmission means 72 primarily includes the control unit 61 and scanner control script 24, and runs the scanner control script 24 and sends an image acquisition request (scan request) to the scanner 3 when the user performs an image acquisition operation in the web page 21. More specifically, the image acquisition request transmission means 72 sends an image acquisition request containing scanner identification information (information such as a scanner ID or communication port) identifying a scanner 3 and scanning configuration information (such as the scanning area, resolution, color/gray scale/monochrome setting, the image processing method to use for scanning, and a time limit to complete processing) to the service endpoint address of the interface board 5. The service endpoint address of the interface board 5 and the scanner identification information are previously set in the scanner control script 24. The scanning configuration information is set by, for example, displaying a setup window on the web page 21 and the user inputting the settings in the setup window when the user performs an image acquisition operation.

The image acquisition means 73 primarily includes the control unit 61 and scanner control script 24, and acquires the image captured by the scanner 3 in response to the image acquisition request through the interface board 5. Note that the image acquisition means 73 interrupts image acquisition when the web page 21 is changed (when an unload event occurs) during scanning (while an image is being received). This is because the scanner control script 24, which is an element of the image acquisition means 73, is embedded in the web page 21, and the scanner control script 24 is lost when the web page 21 is changed.

The main parts of the drawing process means 74 are the control unit 61, page control script 22, and scanner control script 24, and the drawing process means 74 draws the image acquired from the scanner 3 (the image scanned by the scanner 3) in the drawing area by running the scanner control script 24. When the user performs an input operation on the web page 21 displayed by the web browser 66, the drawing process means 74 edits (processes) the image acquired from the scanner 3 or merges the acquired image with another image (an image selected by the user) by drawing the result of the user input (the result of inputting text or selecting an image, for example) in the drawing area by running the page control script 22.

The main parts of the print data generation means 75 are the control unit 61 and printing control script 23. When the user performs a print operation (such as pressing a print button) on the web page 21, the print data generation means 75 runs the printing control script 23 to convert the image data drawn in the drawing area to a form that can be processed by the printer 4, generating print data (such as a raster image command, bitmap file, or XML print data). The print data generation means 75 also temporarily stores the generated print data in a specific storage area (storage unit 62). Web storage, for example, can be used to temporarily store the print data.

The control unit 61 and printing control script 23 are the main parts of the print process request transmission means 76, which sends a printing process request to the printer 4. More specifically, the print process request transmission means 76 sends a printing process request containing printer identification information (such as the printer ID or communication port) identifying the printer 4, and the print data temporarily stored (generated) by the print data generation means 75, to the service endpoint address of the interface board 5. Note that the service endpoint address of the interface board 5 and the printer identification information are previously set in the printing control script 23. If the web page 21 is changed (if an unload event occurs) while the print data is being sent, the print process request transmission means 76 interrupts transmission. This is because the printing control script 23, which is an element of the print process request transmission means 76, is embedded in the web page 21, and the printing control script 23 is lost when the web page 21 is changed.

The event processing means 77 primarily includes the control unit 61, display unit 63, page control script 22, printing control script 23, and scanner control script 24, and reports various events to the user. More specifically, when a user operation causes an event that changes the displayed web page 21 (a beforeunload event) while the scanner control script 24 is running and an image is being acquired from the scanner 3 (while the scanner is operating), the event processing means 77 presents a message indicating that the scanner 3 is operating and displays an operation selection window (selection window display unit) for selecting whether or not to stop scanner 3 operation (whether to stop or continue scanner operation). If the user chooses to continue scanner operation in this operation selection window, changing the web page 21 is stopped. However, if the user chooses to stop scanner operation in this operation selection window, the event processing means 77 sends a request to stop scanner 3 operation (including scanner identification information) to the interface board 5, and displays a notice that the image acquisition process was interrupted (stop operation request transmission unit).

When a user operation causes an event that changes the displayed web page 21 while the printing control script 23 is running and the printing process is executing (while print data is being sent), the event processing means 77 presents a change confirmation window for selecting whether or not to change the web page 21. If the option that cancels changing the web page is selected by the user in this change confirmation window, changing the web page 21 is stopped. However, if the option that changes the web page is selected by the user in the change confirmation window, the event processing means 77 displays a notice indicating that print data transmission was interrupted.

The interface board 5 has a process request receiving means 81 (image acquisition request receiving unit, print data receiving unit), process command means 82 (print control unit), and board-side image transmission means 83 (image transmission unit). The process request receiving means 81 primarily includes the control unit 31 and HTTP server 35, and receives process requests (such as the printing process request, image acquisition request, and stop operation request) from the client terminal 2 (printing control script 23 and scanner control script 24). The process command means 82 primarily includes the control unit 31, and sends commands to the scanner 3 or printer 4 based on the process request received by the process request receiving means 81. More specifically, when the process request from the client terminal 2 is a printing process request, the process command means 82 sends print data to the printer 4 specified by the printer identification information. When the process request from the client terminal 2 is an image acquisition request, the process command means 82 sends a command based on the image acquisition request to the scanner 3 specified by the scanner identification information. When the process request from the client terminal 2 is a stop operation request, the process command means 82 sends a command based on the stop operation request to the scanner 3 specified by the scanner identification information. The board-side image transmission means 83 primarily includes the control unit 31 and HTTP server 35, and receives and sends the image captured by the scanner 3 to the client terminal 2.

The scanner 3 primarily includes an image reading means 91, scanner-side image transmission means 92, and image reading interruption means 93. The image reading means 91 primarily includes a control unit 41 and image reader 43, and based on an image acquisition command (image acquisition request) received from the interface board 5, scans the document set on the document table with the image reader 43. The scanner-side image transmission means 92 primarily includes the control unit 41, and sends the image captured by the image reading means 91 to the interface board 5. The image reading interruption means 93 primarily includes the control unit 41 and image reader 43, and based on a stop operation command (stop operation request) received from the interface board 5 stops (interrupts) scanning by the image reader 43.

The printer 4 has a printer-side print data receiving means 101 and printing means 102. The printer-side print data receiving means 101 primarily includes a control unit 51, and receives print data sent from the client terminal 2 through the interface board 5. The printing means 102 primarily includes the control unit 51 and print mechanism 53, and prints images based on the received print data. The printing means 102 prints in the printing process after all print data sent from the client terminal 2 has been received. More specifically, the print data sent from the client terminal 2 is temporarily stored to a specific storage area in the storage unit 52, and the stored print data is then read and printed.

Figure 3:
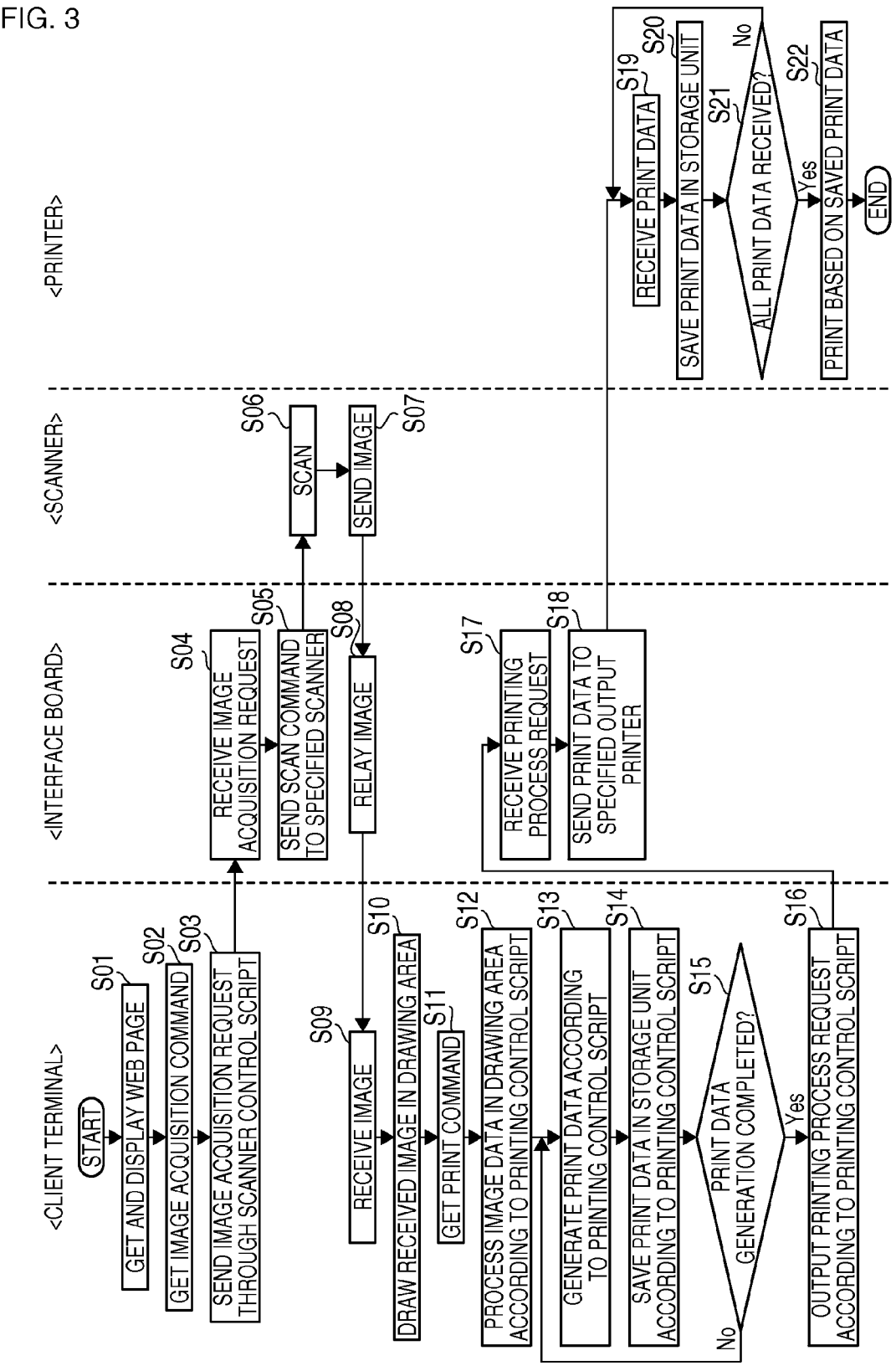
FIG. 3 is a flow chart describing steps in an image acquisition process and printing process on the network system.

Steps in the image acquisition process (image input process) and printing process in this network system SY are described next with reference to the flow chart in FIG. 3. First, the client terminal 2 (control unit 61) accesses the web application server 1 (web application 15) based on user operations in the web browser 66, gets the desired web page 21 (the web page 21 containing the page control script 22, printing control script 23, and scanner control script 24), and displays the web page 21 in the web browser 66 (S01, web page acquisition step).

When the user then performs an image acquisition operation on the web page 21 (such as clicking a scan button displayed on the web page 21), the client terminal 2 acquires an image acquisition command accompanying the image acquisition operation by means of the page control script 22 (S02). Triggered by acquiring this image acquisition command, the scanner control script 24 is called from the page control script 22, and the image acquisition process starts.

More specifically, the client terminal 2 sends an image acquisition request to the interface board 5 (the service endpoint address of the interface board 5) by executing the scanner control script 24 (S03, image acquisition request transmission step). Identification information (scanner identification information) for the desired scanner 3, and the configuration information for scanning operation, are contained in this image acquisition request.

The interface board 5 (control unit 31) then receives the image acquisition request (S04, image acquisition request reception step), and issues a command (scan command) to the specified scanner 3 based on the image acquisition request (S05). The scanner 3 (control unit 41) that received the scan command from the interface board 5 controls the image reader 43 to start the document scanning process (S06), and sends the scanned image through the interface board 5 to the client terminal 2 (S07, S08, image transmission step).

Once the image that was captured by the scanner 3 is received from the interface board 5 (S09, image acquisition step), the client terminal 2 draws the image in the drawing area (S10). After the image is drawn and the user then performs a specific input operation on the web page 21, the client terminal 2 receives the input operation according to the page control script 22 embedded in the web page 21, and draws the result of the received input operation in the drawing area. More specifically, processes such as editing the image acquired from the scanner 3 or merging the image with another image selected by the user can be performed. Process control when an event that changes the web page 21 occurs as a result of user operation of the browser during the image acquisition process (while scanning) is described below with reference to FIG. 4.

If the user calls a printing operation from the web page 21 after the image is drawn in S10 (such as by clicking a print button on the web page 21), the client terminal 2 receives a print command resulting from the printing operation from the page control script 22 (S11). Triggered by getting this print command, the printing control script 23 is called from the page control script 22, and the printing process starts.

More specifically, the client terminal 2 image processes (such as digitizing and gathering) the image drawn in the drawing area according to the printing control script 23 (S12), converts the image data to print data in a form that can be processed by the printer 4 (S13), and saves the resulting print data in the storage unit 62 (S14). Steps S13 and S14 repeat until print data generation is completed, that is, until all image data drawn in the drawing area is converted to print data (S15 returns No).

When print data generation is completed (S15 returns Yes), the client terminal 2 sends a printing process request to the interface board 5 (the service endpoint address of the interface board 5) by running the printing control script 23 (S16). Identification information (printer identification information) for the desired printer 4, and the print data stored in the storage unit 62, are included in this printing process request.

When the printing process request from the client terminal 2 is received (S17), the interface board 5 sends the print data to the printer 4 specified by the printer identification information (S18). After the print data is received from the interface board 5 (S19), the printer 4 (control unit 51) saves the print data in the storage unit 52 (S20). Steps S19 and S20 repeat until all print data is received (S21 returns No). After all print data is received (S21 returns Yes), the printer 4 reads and prints based on the saved print data (prints an image) (S22).

Figure 4:
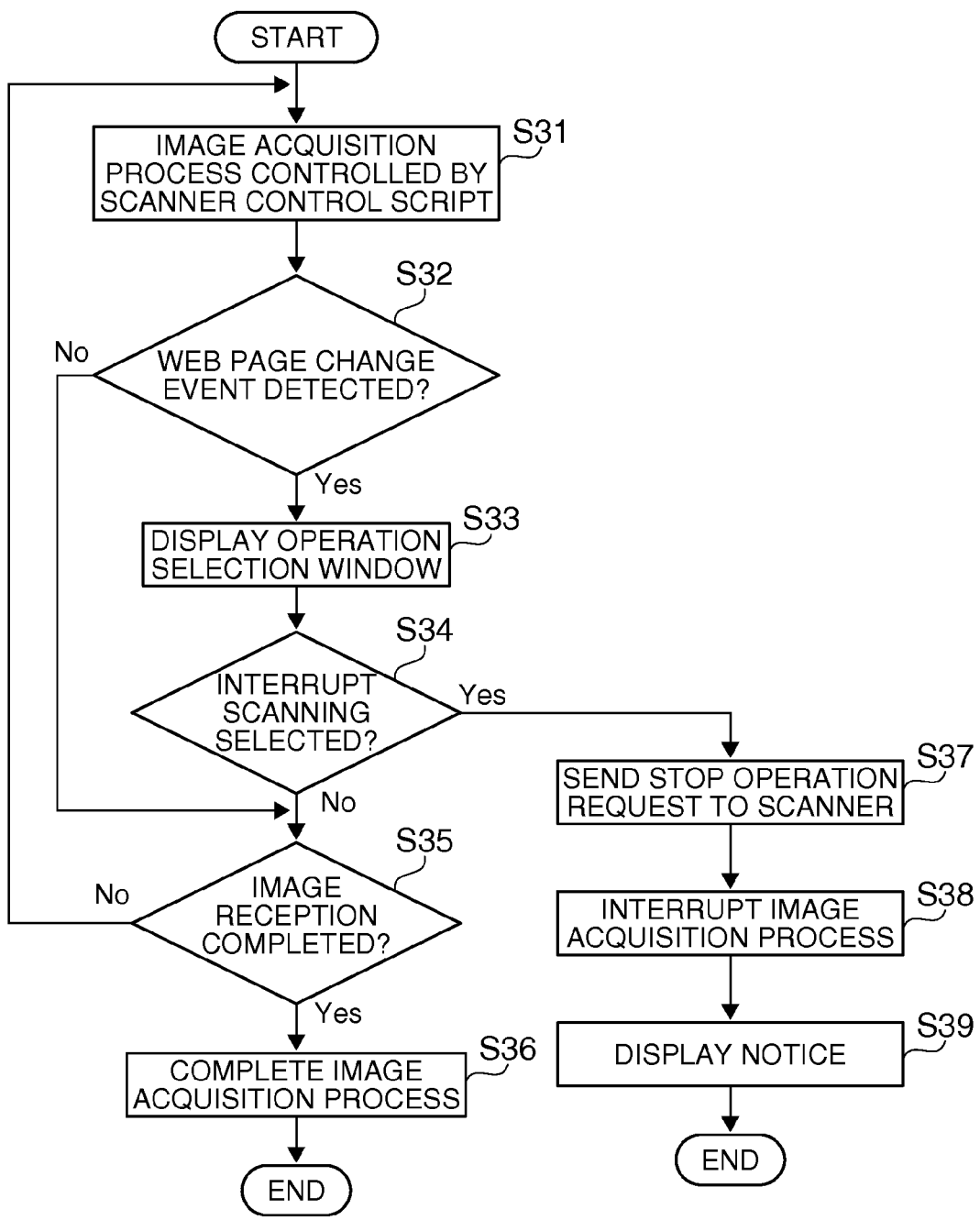
FIG. 4 is a flowchart of steps in a process for handling an event that changes the web page during the image acquisition process.

The steps performed when an event that changes the web page 21 is generated while the client terminal 2 is receiving an image from the scanner 3 (during the scanning process) is described next with reference to the flow chart in FIG. 4. Note that a special process is not performed when an event that changes the web page 21 is not generated, and description thereof is omitted in the following description of the flow chart in FIG. 4.

The client terminal 2 (control unit 61) first starts the image acquisition process of the scanner 3 by means of the scanner control script 24 (S31). If an event that changes the displayed web page 21 (that is, the web page 21 in which the currently executing scanner control script 24 is embedded) to another page is generated by the user using the web browser 66 (S32 returns Yes), the client terminal 2 continues image acquisition by running the scanner control script 24 while simultaneously displaying a message indicating that the scanner 3 is operating and an operation selection window for selecting whether or not to stop the scanning operation of the scanner 3 (S33).

If continuing the scanning operation is selected by the user in this operation selection window (S34 returns No), the client terminal 2 continues the image acquisition process by running the scanner control script 24, and when all image data has been received (S35 returns Yes), ends the image acquisition process (S36). However, if stopping the scanning operation is selected by the user in this operation selection window (S34 returns Yes), the client terminal 2 sends a stop operation request to the scanner 3 (S37), interrupts the image acquisition process (S38) in conjunction with losing the scanner control script 24, and displays a message indicating that the image acquisition process was stopped (S39). By thus displaying an operation selection window when an event that changes the web page 21 occurs, unintended interruption of the image acquisition process (image input from the scanner 3) resulting from the user accidentally changing the web page can be prevented.

As described above, this embodiment enables acquiring a specific image from a scanner 3 (image input device) using a scanner control script 24 (image input control script) embedded in a web page 21. More specifically, because a scanner 3 can be controlled using a web browser 66 (from within a web page 21), the scanner 3 can be controlled by simply installing a web browser 66 on the client terminal 2, and, unlike with the related art, there is no need to install a device driver (a scanner driver) on each client terminal 2. There is also no need for the manufacturer supplying the scanner 3 to develop plural device drivers for different different operating systems, and the related development cost can be reduced.

Furthermore, because a web browser 66 is typically already installed on most modern client terminals 2 (computers including personal computers and smartphones), even users that are not computer-savvy can easily use the scanner 3 without knowing the operating environment (the type of operating system) of the terminal being used by the user.

This embodiment is described using a scanner 3 as an example of an image input device, but the invention is not so limited. For example, a digital camera (camera) could be used as an image input device. In this implementation, an image input control script that controls (requests a process) selecting files and acquiring images stored in the camera, and controls (requests a process) acquiring a directory of files stored in the camera, is embedded in the web page 21 and used to control the camera.

The identification information that identifies (specifies) the scanner 3 or printer 4 is predefined in the scanner control script 24 and printing control script 23 in this embodiment, but the invention is not so limited. For example, when plural scanners 3 and printers 4 are connected and can be used, the user could be made to select the desired scanner 3 or printer 4 from a device list (a list of scanners or a list of printers), and identification information for the selected scanner 3 or printer 4 sent to the interface board 5 by the corresponding control script.

This embodiment describes a configuration in which the interface board 5 is installed to the printer 4, but the invention is not so limited and a configuration having the interface board 5 installed to the scanner 3 is also conceivable. In this implementation an interface for connecting to the board interface 34 of the interface board 5 is disposed to the scanner 3, and an interface that communicates with the communication unit 33 of the interface board 5 is disposed to the printer 4.

The means (functions) of the interface board 5 in this embodiment can alternatively be rendered by a common personal computer (device server). Further alternatively, a configuration in which the above means are disposed to the scanner 3 and printer 4 is also conceivable.

Elements of the network system SY (client terminal 2 and interface board 5) described above can also be provided as a program. This program can also be provided stored on a storage medium (not shown in the figure). Examples of such storage media include CD-ROM, flash ROM, memory cards (Compact Flash (R), smart media, memory sticks), Compact Discs, magneto-optical discs, Digital Versatile Discs, and floppy disks.

The hardware configuration of the network system SY and process steps are also not limited to the foregoing embodiment, and can be changed as desired without departing from the scope of the invention.

REFERENCE SIGNS LIST 1 web application server
2 client terminal
3 scanner
4 printer
5 interface board
15 web application
21 web page
22 page control script
23 printing control script
24 scanner control script
66 web browser
71 web page acquisition means
72 image acquisition request transmission means
73 image acquisition means
74 drawing process means
75 print data generation means
76 print process request transmission means
77 event processing means
81 process request receiving means
82 process command means
83 board-side image transmission means
SY network system

The invention claimed is:

1. A network system comprising a web application server on which a web application operates, one or more client terminals that use a web browser to access the web application server, and an image input device that operates in conjunction with operation of the client terminal, wherein at least the web application server and the client terminal, and the client terminal and the image input device, are respectively connected over a network, wherein:

the client terminal comprises
a web page acquisition unit that gets from the web application server a web page having an embedded image input control script that operates at least on the web browser and controls image input from the image input device,
an image acquisition request transmission unit that is controlled by the image input control script to send an image acquisition request to the image input device when a specific operation is performed on the acquired web page,
an image acquisition unit that is controlled by the image input control script to acquire an image from the image input device as a response to the image acquisition request,
a selection window display unit that is controlled by the image input control script to display a selection window for selecting whether or not to stop operation of the image input device when a change event that changes the web page occurs while the image input device is operating, and
a stop operation request transmission unit that is controlled by the image input control script to send a stop operation request to the image input device when stopping operation of the image input device is selected in the selection window; and
the image input device comprises
an image acquisition request receiving unit that receives the image acquisition request, and
an image transmission unit that sends an image to the client terminal based on the received image acquisition request;
wherein the client terminal does not include nor use a device driver to control display of the selection window for selecting whether or not to stop operation of the image input device when a change event that changes the web page occurs while the image input device is operating.

2. A network system described in claim 1, further comprising a printer that connects over a network to the client terminal, wherein:
- a printing control script that operates on the web browser and controls printing related to the web page is also embedded in the web page acquired by the web page acquisition unit;
- the client terminal includes
  - a drawing process unit that is controlled by the image input control script to draw an image acquired by the image acquisition unit in a specific drawing area,
  - a print data generating unit that is controlled by the printing control script in conjunction with a print operation on the web page to generate print data that converts the image data drawn in the drawing area to a form that can be processed by the printer, and
  - a print data transmission unit that is controlled by the printing control script to send the generated print data to the printer; and
- the printer includes
  - a print data receiving unit that receives the print data sent by the print data transmission unit, and
  - a print control unit that controls a printing process based on the received print data.

3. Control method for a network system that includes a web application server on which a web application operates, one or more client terminals that use a web browser to access the web application server, and an image input device that operates in conjunction with operation of the client terminal, wherein at least the web application server and the client terminal, and the client terminal and the image input device, are respectively connected over a network, the control method of the network system comprising:
- the client terminal executing
  - a web page acquisition step of getting from the web application server a web page having an embedded image input control script that operates at least on the web browser and controls image input from the image input device,
  - an image acquisition request transmission step that is controlled by the image input control script to send an image acquisition request to the image input device when a specific operation is performed on the acquired web page,
  - an image acquisition step that is controlled by the image input control script to acquire an image from the image input device as a response to the image acquisition request,
  - a selection window display step that is controlled by the image input control script to display a selection window for selecting whether or not to stop operation of the image input device when a change event that changes the web page occurs while the image input device is operating, and
  - a stop operation request transmission step that is controlled by the image input control script to send a stop operation request to the image input device when stopping operation of the image input device is selected in the selection window; and
- the image input device executing
  - an image acquisition request reception step to receive the image acquisition request, and
  - an image transmission step to send an image to the client terminal based on the received image acquisition request;
- wherein the client terminal does not include nor use a device driver to control the display of the selection window for selecting whether or not to stop operation of the image input device when a change event that changes the web page occurs while the image input device is operating.

* * * * *